INVENTOR
ROBERT O. RAGAN
JEROME F. OLSON
BY Robert M. Dunning
ATTORNEY

INVENTOR
ROBERT O. RAGAN
JEROME F. OLSON
BY
ATTORNEY

Nov. 19, 1968   R. O. RAGAN ET AL   3,411,969
METHOD AND APPARATUS FOR HEAT SEALING CARTONS
Filed March 2, 1965   4 Sheets-Sheet 3
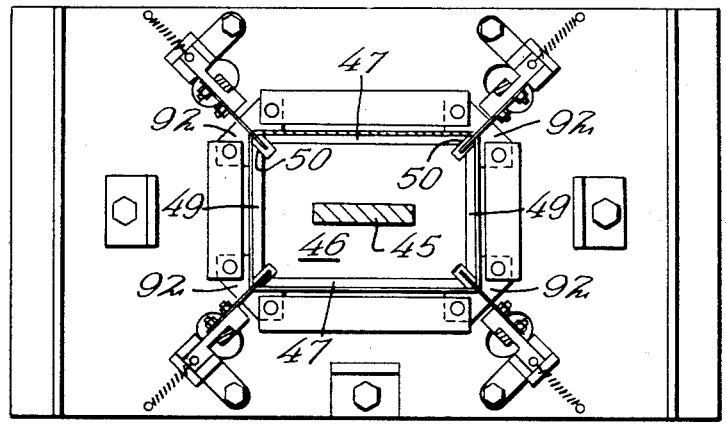
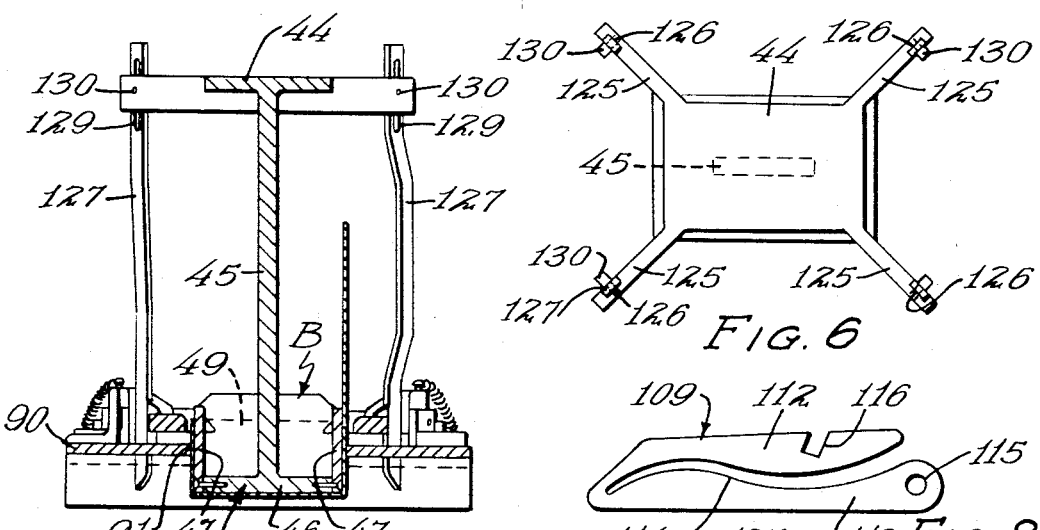
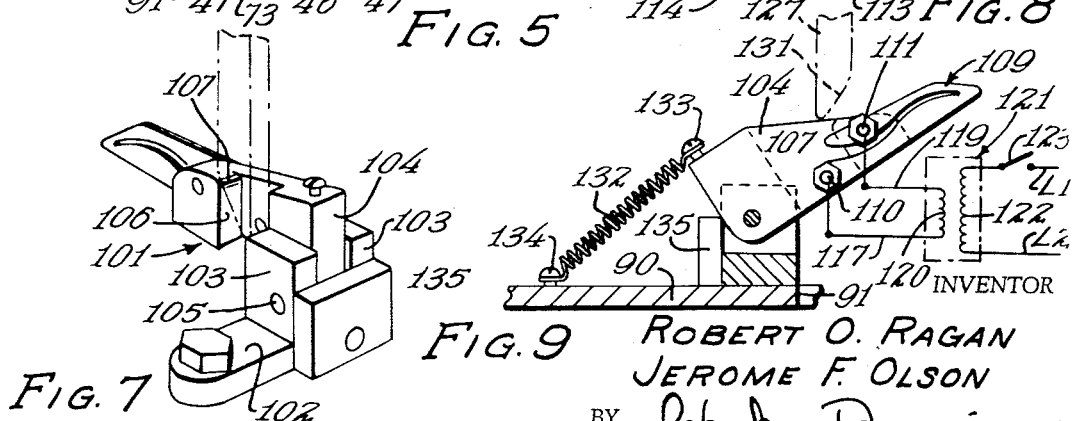
INVENTOR
ROBERT O. RAGAN
JEROME F. OLSON
BY Robert M. Dunning
ATTORNEY Nov. 19, 1968   R. O. RAGAN ET AL   3,411,969
METHOD AND APPARATUS FOR HEAT SEALING CARTONS
Filed March 2, 1965   4 Sheets-Sheet 4

INVENTOR
ROBERT O. RAGAN
JEROME F. OLSON
BY Robert M. Dunning
ATTORNEY

United States Patent Office 3,411,969
Patented Nov. 19, 1968

3,411,969
METHOD AND APPARATUS FOR HEAT SEALING CARTONS
Robert O. Ragan, Minneapolis, and Jerome F. Olson, South St. Paul, Minn., assignors to Waldorf Paper Products Company, Ramsey County, Minn., a corporation of Minnesota
Filed Mar. 2, 1965, Ser. No. 436,567
13 Claims. (Cl. 156—227)

ABSTRACT OF THE DISCLOSURE

A method and apparatus for fusing the edges of a pair of wall panels hingedly connected to a base panel, the panels being of heat fusible material, the apparatus including a thin blade heated to a temperature above the melting point of the material, and means for folding the edges of the panels on opposite sides of the blade diagonally of the edges, and moving the edges over the blade to progressively engage areas of the edges, melting the edges sufficiently to bond them together.

---

This invention relates to an improvement in the method and apparatus for heat sealing cartons and the like and deals particularly with an apparatus for sealing together abutting edges of heat sealable material and in the method of producing such structures.

During recent years, the production of materials such as plastic sheeting has developed to a point where some of this sheeting is competitive with paperboard from a standpoint of cost, and has certain advantages over such paperboard. As an example, polystyrene foam may be produced from which receptacles of one sort or another may be formed. This material is essentially waterproof and greaseproof and, accordingly, possesses admirable qualities for packing such items as cookies, bacon, fresh meats, nuts, and baked goods of various types. Much of the cost of the production of such receptacles has been in the cost of forming the receptacles from flat sheeting. Material of this type may be thermo-vacuum-formed, but even this process is relatively slow as compared to the techniques used in the formation of paperboard trays. Through the use of suitable forming machines, paperboard trays may be formed at speeds in excess of 200 per minute. This is considerably faster than the normal vacuum-forming operation, particularly where the receptacles are of substantial size.

We have found that receptacles of various sorts may be formed by cutting and creasing the sheet material in the same manner as paperboard. However, due to the thickness of the foam sheeting, the material does not lend itself well to the formation of lock corner trays. Material of the type described is heat sealable, but considerable difficulty may be experienced in the sealing operation due to the fact that the heat will not readily flow through the material to heat the surfaces to be sealed. Furthermore, cartons or trays formed by heat sealing two panel portions in surface contact normally are not liquid tight.

It has been found that a tray formed of material such as polystyrene foam may be sealed to provide a water-tight joint by heat sealing the abutting edges of the joint. Such a joint may be produced by inserting a thin heated blade between the edges to be sealed for a short period of time immediately before bringing these edges into contact. The blade is heated to a temperature above the melting point of the sheet so that contact between the sheet edges and the blade softens the plastic to the extent necessary to fuse the edges of the sheet together as they are brought into contact. By holding the abutting edges in contact until the material is cool, a water-tight butt joint may be produced.

It has been found that this process may be effectively accomplished through the use of a forming machine having a female die into or through which the receptacle is forced and a male die in the form of a plunger which engages the flat blank and forces it into the female die. The forming operation may be accomplished at the same speed such machine operates to form corner locked trays, thereby very materially reducing the time previously required for forming receptacles from material of this type.

An object of the present invention resides in the provision of a tray-forming apparatus which may be used in conjunction with panels having abutting edges and which include means for folding the blank on opposite sides of a heated blade so that the blade wipes along the abutting edges as the tray is formed into the female die. As the abutting edges leave contact with the blade, they are immediately urged into contact and held in contact for the short time necessary to cool the plastic. With this apparatus, objects such as trays may be formed at a high rate of speed, and the sealed corners of the trays are normally waterproof so that the tray may be used to hold liquids if so desired.

As will be obvious from the foregoing description, the term "tray" has been used to define virtually any structure having a pair of edges which are to be sealed or welded together along abutting edges. Thus while the form of tray illustrated comprises a rectangular receptacle having four panels sealed together at the corners, the structure may similarly be tapered so that the trays will nest together. For example, multi-sided receptacles may be formed with tapered walls for use as drinking cups or the like. Furthermore, the same method of operation may be used to connect the end edges of a pair of panels hinged to angularly related edges of a base panel providing a single welded joint.

It is a further feature of the present invention that the edges of the panels which are to be fused together are formed slightly wider than they will be in the formed article as the heating of the edges tends to cause the material to retract to some extent. The amount of retraction depends to some extent on the thickness of the sheet being formed and the composition of sheet material. The temperature of the heating blade, and the length of contact time between the sheeting and the blade, also have a definite effect on the effectiveness of the joint, as an effective seal will not be produced if the edges are overheated. However, if the blades are heated to a predetermined temperature, the length of time the blade remains in contact with the edges to be sealed may be easily varied by regulating the speed of the machine.

These and other objects and novel features of the present invention will be more clearly and fully set forth in the following specification and claims.

In the drawings forming a part of the specification,

FIGURE 4 is a horizontal sectional view, the position of the section being indicated by the line 4—4 of FIGURE 3.

FIGURE 5 is a vertical sectional view through the two portions of the die in telescoping relation.

FIGURE 6 is a top plan view showing the top end of the male die.

FIGURE 7 is a perspective view of one of the heated blade supports showing the operating cam in broken lines.

FIGURE 8 is an elevational view of one of the heating blades.

FIGURE 9 is a side elevational view of one of the sealing blades.

Figure 1:
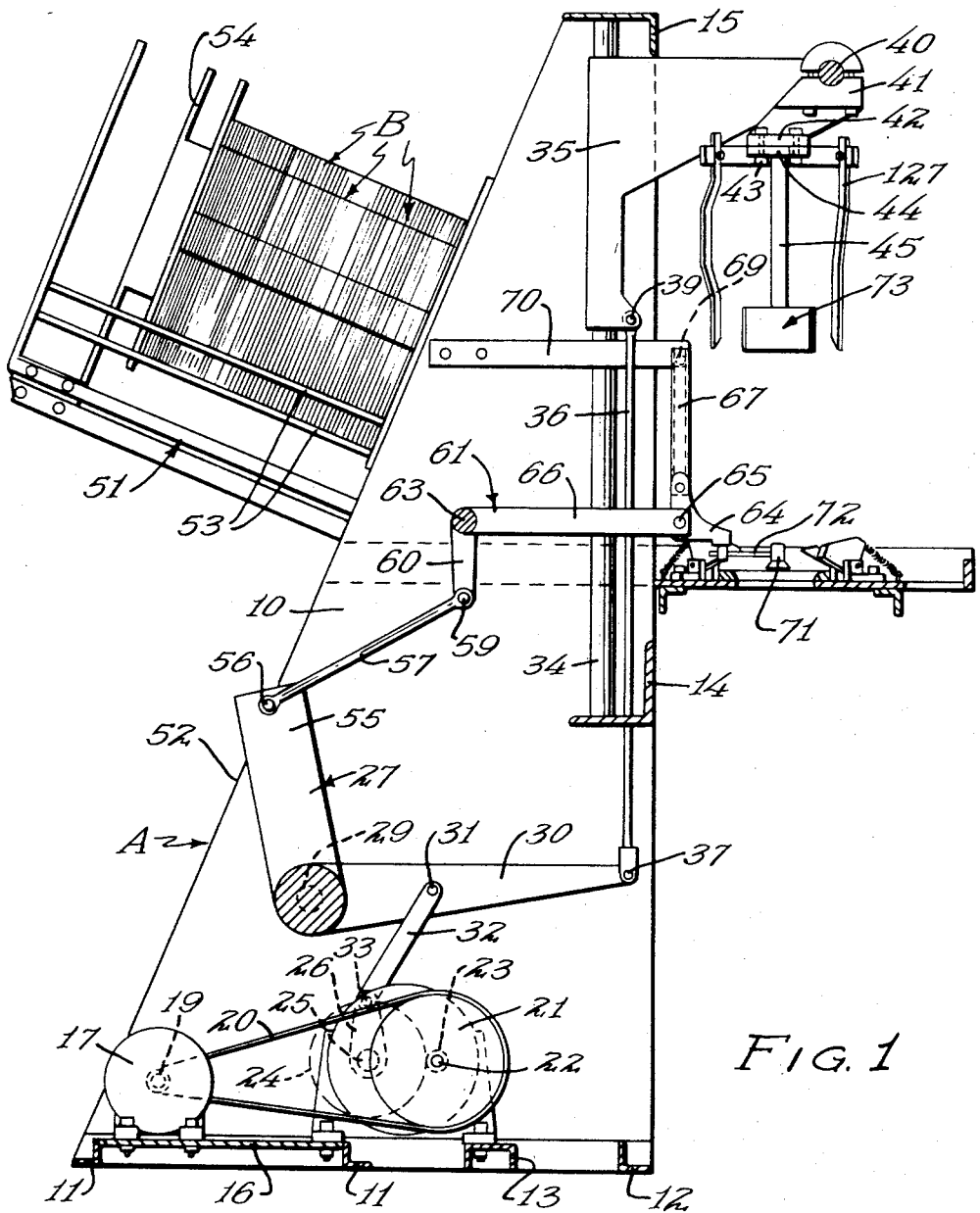
FIGURE 1 is a vertical sectional view through a forming machine, showing diagrammatically the general arrangement of cartons therein.

The specific details of the forming machine are not of utmost importance to the present invention and the forming machine A is shown but diagrammatically in the drawings. The machine A includes a pair of side frames 10, one of which is shown in the drawings, the side frames being connected by various cross-connecting members such as the angles 11 and 12, the inverted channel 13, the cross member 14, and the top-connecting member 15. A platform 16 is supported by the angles 11 and acts to support the drive motor 17 including a drive pulley 19 which is connected by a belt 20 to a cooperable pulley 21 on a drive shaft 22. Gears 23 and 24 connect the drive shaft 22 to a parallel crank shaft 25. The crank shaft 25 supports a crank 26 which serves to drive both the feed mechanism and the reciprocating plunger which supports the male die.

A bell crank lever 27 is pivotally supported by a fixed pivot 29 to the frame member 10. One arm 30 of the bell crank lever 27 is pivotally connected at 31 to a connecting rod 32 pivotally secured to the end of the crank arm 26 as indicated at 33. A pair of slide rods 34 are supported in spaced parallel relation between the cross frame members 14 and 15 and form slidable supports for slides 35 which extend forwardly from the machine or to the right as indicated in FIGURE 1. Connecting links 36 are pivotally connected at their lower ends to the bell crank arms 30 as indicated at 37. The links 36 are pivotally connected at 39 to the slides 35. Thus oscillation of the bell crank lever 27 will transmit motion through the links 36 to vertically reciprocate the slides 35 on the slide rods 34.

A transversely extending supporting shaft 40 extends between the slides 35 and acts as a connection therebetween. Clamping brackets 41 encircle the shaft 40 and act to support a plunger supporting plate 42. The plate 42 is detachably connected by bolts such as 43 to a top plunger plate 44 to which is secured the upper end of the plunger arm 45. A plunger base plate 46 (see FIGURE 5) is secured to the lower end of the plunger arm 45 and vertically extending parallel side walls 47 and vertically extending end walls 49 secured to the right angularly extending edges of the plunger base plate 46 to extend upwardly therefrom. As is indicated in FIGURE 4 of the drawings, the corners of the base plate as well as the corners of the side walls 47 and 49 are notched diagonally for accommodating the heating blades, as will be later described in detail.

An inclined hopper 51 is supported behind the inclined rear edges 52 of the side plates 10, the hopper including a series of parallel rods 53 which support tray blanks B in face contact. Blanks B are held in face contact and urged toward the lower end of the hopper 51 by a weighted plate 54. Projecting fingers, not illustrated in the drawings, are provided for retaining the blanks B in the hopper 51 until the foremost blank is removed by the feed mechanism which will be briefly described.

The bell crank lever 27 is provided on its second arm 55 with a pivot 56 to which is secured one end of a link 57. The other end of the link 57 is connected by a pivot 59 to one arm 60 of a second bell crank lever 61 which is pivoted to the frame by a pivot shaft 63. A suction cup supporting head 64 is pivoted as indicated at 65 to the second arm 66 of the bell crank lever 61. The suction cup supporting head 64 also includes a channel-shaped slide 67 which pivotally and slidably engages a pivot roller 69 on an arm 70 fixed to the side frame 10. The suction cups 71 are supported by adjustable arms 72 to the supporting head 64 and the suction cup supporting arms 72 are pivoted from the horizontal position shown in FIGURE 1 to a position in parallel relation to the blanks B in the hopper 51 by the engagement of the slide 67 with the fixed pivot 69. Thus as the bell crank lever 27 is oscillated by the motor 17, the link 57 acts to oscillate the bell crank lever 61 from the horizontal position illustrated to a position in which the arm 66 is substantially parallel to the surfaces of the blanks B. When in this position, the suction cups 71 are engageable with the foremost blank B which is removed from the hopper and placed in position beneath the plunger which is indicated in general by the numeral 73, and which is supported by the plunger arm 45 as was previously explained.

Figure 10:
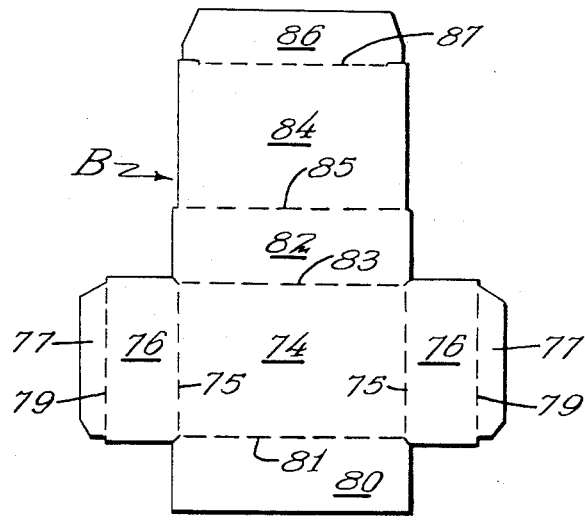
FIGURE 10 is a diagrammatic view of a typical type of tray which may be formed.
Figure 11:
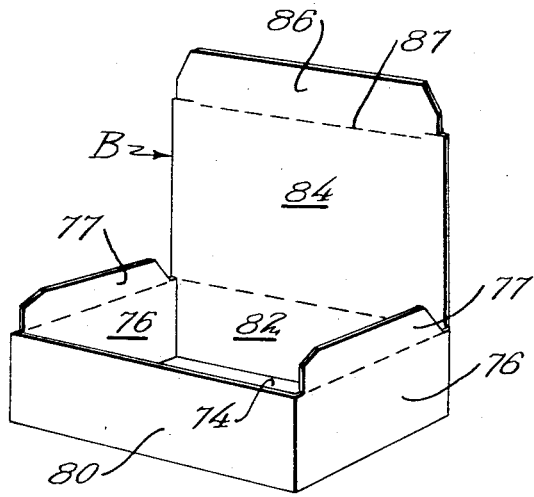
FIGURE 11 is a perspective view of the completed tray.

The purpose of the forming machine A is to form the carton blanks B from the flat form in which they are loaded in the hopper to an erect form in which they are ready for use. A typical blank B is illustrated in FIGURES 10 and 11 of the drawings. The blank B includes a bottom panel 74 which is foldably connected along parallel fold lines 75 to side walls 76. Flaps or flanges 77 are foldably connected to the upper edges of the side walls 76 along parallel fold lines 79. A front wall 80 is hingedly connected to a third edge of the rectangular bottom panels 74 along a fold line 81. A rear wall 82 is foldably connected along the opposite edge of the bottom panel along a fold line 83. The particular blank B illustrated also includes a cover panel 84 hingedly connected to the upper edge of the rear wall 82 along a fold line 85. A tuck flap 86 is hingedly connected to the forward edge of the cover panel 84 along a fold line 87. Obviously, the cover panel and flap may be eliminated where the tray is to be overwrapped.

It is important to note that the side walls 76 are slightly wider than the bottom panel or wider than the distance between the fold lines 81 and 83. The front and rear walls 80 and 82 are also somewhat wider than the bottom panel 74, or somewhat wider than the distance between the fold lines 75 connecting the bottom panel 74 to the side walls 76. For example, if the carton blank B has a bottom panel 74, perhaps 4" x 6" in size, the various wall panels may have dimensions perhaps 1/16" greater on each side than the bottom panel. The reason for this increased size lies in the fact that when the edges are sealed, the material forming the blank has a tendency to draw back or retract so that after these edges have been sealed and welded together, the carton walls are in right angular relation to the bottom panel. The amount of retraction depends upon the thickness of the sheet, the length of time the blank edges are subjected to heat, and similar variables. However, in actual practice where the heating blade is maintained at approximately the same temperature, visual inspection of the cartons as they leave the former will immediately show whether or not a proper seal is being effected.

Figure 2:
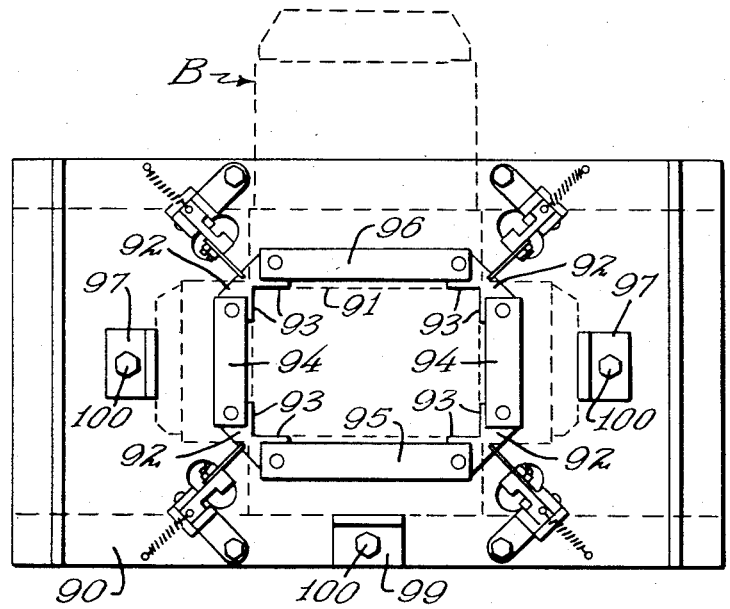
FIGURE 2 is a top plan view of the female die, a tray being shown thereupon in dotted outline.
Figure 3:
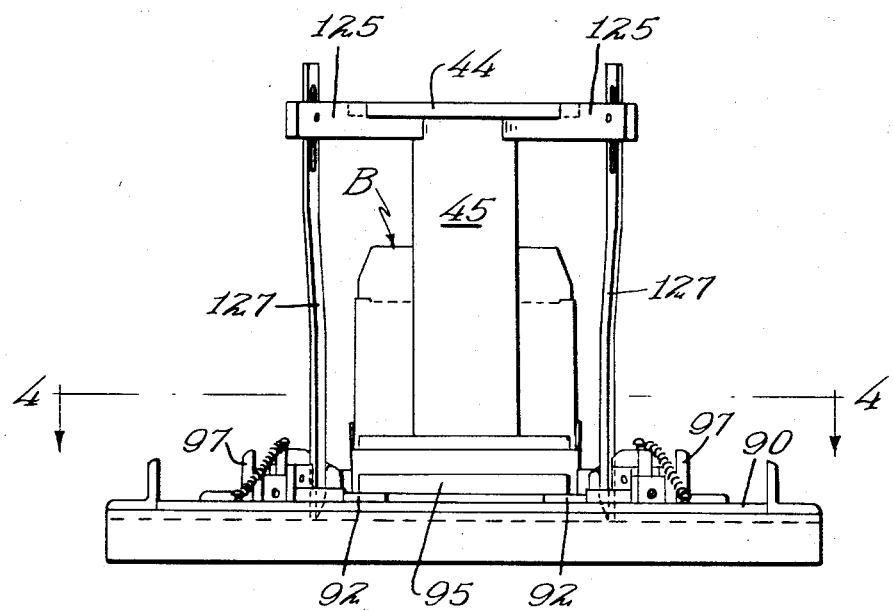
FIGURE 3 is a diagrammatic elevational view of the two portions of the die during the tray-forming operation.

As indicated in FIGURES 2 through 5 of the drawings, the female die includes a table 90 having an aperture 91 through which the carton B is forced by the plunger 73. Corner blocks 92 are provided at each corner of the aperture 91, each corner block 92 including a pair of right angularly arranged surfaces 93 which define therebetween an opening which is the approximate size of the bottom panel 74 of the blank. The corner block surfaces 93 are designed to engage the corners of the carton just after the edges have been heated to hold the wall panels in right angular relation. Usually the corner blocks 92 are made of heat conductive material such as metal which tend to cool the heated corners just after they have been brought into contact and in edge abutting relation. The corner block 92 supports parallel side forming blocks 94, a front wall forming block 95, and a rear wall forming block 96, the inner edges of which are spaced apart a distance somewhat greater than the dimensions of the bottom panel 74. FIGURE 2 of the drawings shows a carton blank B in dotted outline resting upon the forming blocks 94, 95, and 96, the blank being held in proper relation to the male die by adjustable side brackets 97 and a front bracket 99 which is secured to the table by bolts 100 or other suitable means. When properly located, the corners of the carton bottom panel 74 are substantially aligned with the right angularly arranged surfaces 93 of the corner block 92.

A heating blade unit, identified in general by the numeral 101, is supported near each corner of the female die with the heating blade extending diagonally in the particular form of construction illustrated. The unit 101 includes a base member 102 which supports a pair of upwardly extending parallel ears 103. A blade supporting arm 104 is pivotally mounted between the ears 103 on a horizontal pivot 105. The arm 104 is formed of a material which acts as an electrical insulator as well as a heat insulator. One side of the arm 104 is notched or grooved as indicated at 106 and a rounded portion 107 of the arm adjoining the notch 106 acts as a cam surface as will be later described. A thin flat blade 109 is secured to the arm 104 by bolts 110 and 111, respectively. In the particular arrangement illustrated, the blade 109 is made of Nichrome and acts as a resistance element when electrical current passes through the blade. The blade 109 is preferably divided into two parallel or side-by-side sections by a slot 114 which extends from the anchored end of the blade to a point closely adjacent to the free and thereof. The terminal bolt 110 extends through an aperture 115 in the blade portion 113 while the bolt 111 extends through a notch 116 in the end 112 of the blade. With this arrangement, the electrical current must pass from one terminal 110 to the other terminal 111 by flowing through the blade side 113 around the unslotted free end of the blade, and back through the opposite side 112 of the blade to the terminal 111.

FIGURE 9 of the drawings diagrammatically illustrates conductors 117 and 119 leading from the terminals 110 and 111 to the transformer coil 120 of the transformer 121. The primary transformer coil 122 is connected between line wires L-1 and L-2 through a control switch 123.

As is indicated in FIGURE 6 of the drawings, the top plunger plate 44 is provided at its corners with diagonally extending arms each of which is provided with a vertically extending groove 126 to slidably support a cam arm 127. As is indicated in FIGURE 5 of the drawings, each cam arm 127 is slotted as indicated at 129 to accommodate a clamping bolt 130. The lower end 131 of each cam arm 127 is angled downwardly and outwardly as indicated in FIGURES 7 and 9 of the drawings. These inclined ends 131 engage the rounded cam surface 107 of a corresponding blade arm 104 to swing the arm 104 from the upwardly inclined position illustrated in FIGURE 9 of the drawings to a substantially horizontal position shown in FIGURES 5 and 7. The arms 104 are normally biased into their upwardly inclined position by springs 132 connecting a spring anchoring member 133 on the arm 104 to a fixed anchor 134 on the table 90. The upward tilting of each arm 104 is limited by a suitable stop lug 135.

The purpose of this arrangement is to support the heating blades out of the path of movement of the blanks B as they are moved down onto the female die, but to permit the ends of these heating blades to extend over the corners of the bottom panel 74 of the blanks when the bottom panel is engaged by the plunger 73. It is important that the heating blade never remain in stationary contact with the edges of the blank during the forming operation. It is also necessary that the blades engage the edges of the blank closely adjacent to the juncture of the walls with the bottom panel. Accordingly, the heating blades are swung over the corners of the bottom panel as the side and end walls of the tray are folded upwardly by the forming die. As the plunger descends, the cam 127 engage the blade supporting arms 104 and swing the blade downwardly, the heated blades following the movement of the carton until the edges which are to be sealed together are swung upwardly into contact with opposite sides of the heating blade. At this point, the blade stops and continued downward movement of the plunger causes the abutting edges of the carton to wipe across opposite surfaces of the blade immediately before they are forced into engagement. This is possible because only the thickness of the blade separates the surfaces to be sealed so that as the heated edges move past the blade, these edges are welded together.

We have found that by sandwiching a thin heating blade between two edges of a polystyrene foam sheet, wiping the abutting edges along the surface of the blade and immediately bringing the edges together as they leave contact with the blade, an extremely effective butt joint may be produced which may be a water-tight seam. Through the use of this method, thin sheets of material such as polystyrene foam may be handled by techniques used in the production and handling of paperboard cartons. The formation of cartons in this way is normally much quicker than forming the plastic sheeting by the conventional method such as by vacuum forming the sheet. Furthermore, the resulting cartons or trays have the advantage of being of uniform thickness throughout the carton. This differs from receptacles formed by vacuum-forming methods or drawing methods in which the thickness of the sheet varies due to the flow of the material.

In accordance with the patent statutes, we have described the principles of construction and operation of our method and apparatus; and while we have endeavored to set forth the best embodiment thereof, we desire to have it understood that obvious changes may be made within the scope of the following claims without departing from the spirit of our invention.

We claim:

1. The method of joining the edges of a pair of angularly related panels of fusible sheet plastic, the panels being hingedly connected to a pair of angularly related edges of a third panel along lines of fold, the edges of the panels of said pair each extending beyond the intersection of the lines of fold, the method consisting in
   folding in panels to bring the edges to be joined substantially into edge abutting relation,
   heating the ends of said edges to the fusing temperature of the plastic while holding the edges in slightly spaced relation,
   progressively heating localized areas through the length of the edges to be joined while holding the area of the edges being heated slightly spaced, and
   simultaneously bringing the previously heated localized areas into contact to fuse the edges, said edges, when fused, no longer extending beyond the intersection of the lines of fold.

2. The method of claim 1 and including the step of holding the fused edges in contact until they cool below the fusing temperature of the plastic.

3. The method of claim 1 and including the further step of withdrawing the heat prior to bringing the edges together.

4. A method of forming a receptacle of heat fusible material having a bottom panel and side wall panels hinged to said bottom panel, said side wall panels having edges adapted to engage in edge abutting relation, the method including the steps of
   applying heat progressively in planes extending diagonally relative to the planes of the side wall panels to the edges to be sealed in localized areas from one end of the edges to the other while holding the edges in said localized areas in slightly spaced relation,
   bringing the localized areas of said edges to fusing temperature, and
   progressively bringing together the localized areas which have been heated into contact while still at fusing temperature to progressively fuse the edges.

5. The method of claim 4 and in which the receptacle is moved in a direction generally normal to the receptacle bottom panel relative to the source of heat.

6. A heat sealing apparatus for use in fusing the edges of a pair of wall panels hingedly connected to two adjoining edges of a base panel, the panels being formed of a heat fusible plastic sheeting, the apparatus including
- a thin flat blade of heat conductive material,
- means for heating said blade above the fusing temperature of the sheeting,
- means for folding said wall panels relative to said base panel to move said adjoining edges against opposite surfaces of said flat blade,
- said blade being narrow relative to the length of said edges,
- means for moving said panels in a direction longitudinally of said edges to progressively engage areas of said edges with said blade, and
- means for progressively guiding the areas of said edges which have been heated into contact.

7. The structure of claim 6 and in which said blade comprises a resistance element, and said heating means comprises a source of electrical current connected to said blade.

8. The structure of claim 6 and in which said blade is slotted from one end thereof to a point spaced from the other end thereof, said blade being formed of a material resistant to the flow of electrical current, and in which said heating means comprises a source of electrical current connected to said one end of said blade on opposite sides of said slot.

9. An apparatus for forming a tray-like body from a blank having a base panel and a series of wall panels connected foldably to the edges of said base panel, said panels being formed of heat sealable material, the apparatus including
- a forming die into which said blank may be forced to fold the wall panels into angular relation to said base panel and to bring the side edges of said wall panels substantially into edge abutting relation,
- a thin blade supported on a plane substantially normal to said base panel between the adjoining edges of each pair of wall panels,
- means for heating said blade above the fusion temperature of said blank,
- said die folding the adjoining edges of said wall panels against opposite surfaces of said blade,
- means for moving said folded blank relative to said blades to disengage said edges from said blade,
- said die folding said edges into contact as said edges are disengaged from said blade.

10. The structure of claim 9 and in which said means for moving said blank comprises a plunger engageable with said base panel to plunge said blank into said die.

11. The structure of claim 9 and in which the blade is pivotally supported for movement in a vertical plane from a position in which the blade is outside of the dimensions of the base panel to a position in which the blade partially overlies the base panel when positioned on said die.

12. A heat sealing apparatus for use in fusing the edges of a pair of angularly related panels of heat fusible material, the apparatus including:
- an elongated thin blade of heat conductive electrically resistant material,
- said blade being longitudinally slit from one end of the blade to a point near the opposite end thereof,
- insulating means supporting the slit end of said blade with the unslit end projectable between the edges to be sealed,
- current supply means connected to said blade on opposite sides of the slit end thereof the current being adapted to flow longitudinally of said blade on one side of said slit to said unslit end and then longitudinally of the blade on the other side of the slit.

13. The apparatus of claim 12 and in which said slit extends closest to the longitudinal edges of the blade adjacent to said unslit end.

References Cited

UNITED STATES PATENTS

| | | | |
|---|---|---|---|
| 3,317,114 | 5/1967 | Ragan et al. | 229—30 |
| 3,361,041 | 1/1968 | Grob | 156—226 |
| 3,367,819 | 2/1968 | Schlag | 156—227 |
| 2,160,221 | 5/1939 | Masters et al. | 156—227 X |
| 2,843,027 | 7/1958 | Sevison | 156—380 X |
| 2,983,306 | 5/1961 | Resnick | 156—380 |
| 3,282,766 | 11/1966 | Wright | 156—304 X |

HAROLD ANSHER, *Primary Examiner.*